US012128579B2

(12) United States Patent
Gereg

(10) Patent No.: US 12,128,579 B2
(45) Date of Patent: Oct. 29, 2024

(54) IMPELLERS FOR CUTTING MACHINES AND CUTTING MACHINES EQUIPPED THEREWITH

(71) Applicant: Urschel Laboratories, Inc., Chesterton, IN (US)

(72) Inventor: Dustin J. Gereg, Valparaiso, IN (US)

(73) Assignee: Urschel Laboratories, Inc., Chesterton, IN (US)

( * ) Notice: Subject to any disclaimer, the term of this patent is extended or adjusted under 35 U.S.C. 154(b) by 0 days.

(21) Appl. No.: 17/668,550

(22) Filed: Feb. 10, 2022

(65) Prior Publication Data

US 2022/0258371 A1 Aug. 18, 2022

Related U.S. Application Data

(60) Provisional application No. 63/148,698, filed on Feb. 12, 2021.

(51) Int. Cl.
*B26D 7/06* (2006.01)
*B26D 3/26* (2006.01)

(52) U.S. Cl.
CPC ............ *B26D 7/0641* (2013.01); *B26D 3/26* (2013.01)

(58) Field of Classification Search
CPC .......... B26D 6/0691; B26D 1/03; B26D 3/26; B26D 7/0641; B26D 2210/02; B02C 18/062
See application file for complete search history.

(56) References Cited

U.S. PATENT DOCUMENTS 2,004,548 A * 6/1935 Geoffrey .............. B26D 7/0691 83/404.3
2,242,557 A * 5/1941 Urschel .................... B26D 3/22 83/116

(Continued)

FOREIGN PATENT DOCUMENTS

EP 3148759 B1 3/2019
WO 2007124039 A1 11/2007

OTHER PUBLICATIONS

International Search Report and Written Opinion for International Application No. PCT/US2022/016058, dated May 17, 2022, (11 pages).

*Primary Examiner* — Ghassem Alie
*Assistant Examiner* — Samuel A Davies
(74) *Attorney, Agent, or Firm* — Hartman Global IP Law; Gary M. Hartman; Domenica N. S. Hartman

(57) ABSTRACT

Machines for cutting products and impellers therefor. Such an impeller is adapted to be coaxially mounted within a cutting head for rotation therein. The impeller includes a lower plate having a paddle that directs material placed on the lower plate in a radially outward direction of the impeller when the impeller is rotated. A recess in the lower plate is continuous between upper and lower surfaces of the lower plate and contiguous with the perimeter of the lower plate to define a passageway to enable debris at the upper surface to exit the impeller therethrough. A chute is located at an outer radial extent of the paddle and defines a first opening adjacent the paddle, a second opening adjacent the recess, and a passageway within the chute and between the first and second openings through which the debris passes before exiting the impeller through the passageway of the recess.

35 Claims, 15 Drawing Sheets

(56) References Cited

U.S. PATENT DOCUMENTS

| | | | | | |
|---|---|---|---|---|---|
| 2,291,760 | A * | 8/1942 | Rupp | F04D 9/005 415/56.6 |
| 2,485,344 | A * | 10/1949 | Geoffrey | B26D 3/185 83/112 |
| 3,106,006 | A * | 10/1963 | Perovich | B28B 21/242 15/104.095 |
| 3,108,660 | A * | 10/1963 | Smith | F16D 57/02 188/290 |
| 3,139,128 | A | 6/1964 | Urschel et al. | |
| 3,139,129 | A | 6/1964 | Urschel et al. | |
| 3,258,211 | A * | 6/1966 | Behnke | B02C 13/1842 241/275 |
| 3,605,840 | A * | 9/1971 | Morrett | B26D 3/26 83/425.3 |
| 3,970,257 | A * | 7/1976 | MacDonald | B02C 13/1842 241/275 |
| 4,206,671 | A * | 6/1980 | Hoehn | B26D 3/22 83/410.8 |
| 4,523,503 | A | 6/1985 | Julian et al. | |
| 4,610,397 | A * | 9/1986 | Fischer | B02C 18/062 241/257.1 |
| 5,004,169 | A * | 4/1991 | Ostergaard | B02C 13/2804 241/192 |
| 5,358,189 | A * | 10/1994 | Vandermolen | B02C 13/04 241/154 |
| 9,193,086 | B2 * | 11/2015 | Jacko | B26D 1/03 |
| 9,643,332 | B2 * | 5/2017 | Bucks | B26D 5/08 |
| 10,265,877 | B2 * | 4/2019 | Bucks | B26D 7/0691 |
| 2007/0240550 | A1 | 10/2007 | Jacko et al. | |
| 2008/0022822 | A1 | 1/2008 | Jacko et al. | |
| 2014/0230621 | A1 | 8/2014 | Bucks | |
| 2016/0288358 | A1 | 10/2016 | Bucks | |
| 2019/0232514 | A1 | 8/2019 | Bucks | |
| 2022/0126475 | A1 * | 4/2022 | Barber | B26D 7/0691 |
| 2023/0012222 | A1 * | 1/2023 | Barber | B26D 1/03 |

* cited by examiner

IMPELLERS FOR CUTTING MACHINES AND CUTTING MACHINES EQUIPPED THEREWITH

CROSS-REFERENCE TO RELATED APPLICATIONS

This application claims the benefit of U.S. Provisional Application No. 63/148,698, filed Feb. 12, 2021, the contents of which are incorporated herein by reference.

BACKGROUND OF THE INVENTION

The present invention generally relates to machines for cutting products, including but not limited to slicing food products. The invention particularly relates to impellers for use with cutting machines.

Various types of equipment are known for slicing, shredding and granulating food products, as nonlimiting examples, vegetables, fruits, dairy products, and meat products. Widely used machines for this purpose are commercially available from Urschel Laboratories, Inc., and include machines under the name Model CC®. The Model CC® machines are centrifugal-type slicers capable of slicing a wide variety of products at high production capacities. The Model CC® line of machines is particularly adapted to produce uniform slices, strip cuts, shreds, and granulations. Certain configurations and aspects of Model CC® machines are represented in U.S. Pat. Nos. 3,139,128, 3,139,129, 5,694,824, 6,968,765, 7,658,133, 8,161,856, 9,193,086, 10,456,943, and 10,632,639, the entire contents of which are incorporated herein by reference.

FIG. 1 schematically represents a cross-sectional view of a machine 10 that is representative of a Model CC® machine. The machine 10 includes a generally annular-shaped cutting head 12 and an impeller 14 coaxially mounted within the cutting head 12. The impeller 14 has an axis 17 of rotation that coincides with the center axis of the cutting head 12, and is rotationally driven about its axis 17 through a shaft (not shown) that is enclosed within a housing 18 and coupled to a gear box 16. The cutting head 12 is mounted on a support ring 15 above the gear box 16 and remains stationary as the impeller 14 rotates. Products are delivered to the cutting head 12 and impeller 14 through a feed hopper 11 located above the impeller 14. In operation, as the hopper 11 delivers products to the impeller 14, centrifugal forces cause the products to move outward into engagement with cutting knives (not shown) that are mounted along the circumference of the cutting head 12. The impeller 14 comprises generally radially oriented paddles 13, each having a face that engages and directs the products radially outward toward and against the knives of the cutting head 12 as the impeller 14 rotates. Other aspects pertaining to the construction and operation of Model CC® machines, including various embodiments thereof, can be appreciated from the aforementioned prior patent documents incorporated herein by reference.

FIG. 2 is an isolated view of a particular but nonlimiting example of a cutting head 12 that has been used with Model CC® slicing machines, including the machine 10 schematically represented in FIG. 1. The cutting head 12 represented in FIG. 2 will be described hereinafter in reference to the machine 10 of FIG. 1 equipped with an impeller 14 as described in reference to FIG. 1. On the basis of the coaxial arrangement of the cutting head 12 and the impeller 14, relative terms including but not limited to "axial," "circumferential," "radial," etc., and related forms thereof may be used below to describe the cutting head 12 represented in FIG. 2.

In FIG. 2, the cutting head 12 can be seen as generally annular-shaped with cutting knives 20 mounted and circumferentially spaced apart along its perimeter. FIG. 2 represents the knives 20 as having straight cutting edges for producing flat slices, and as such may be referred to herein as "flat" knives, though the cutting head 12 can use knives of other shapes, for example, "corrugated" knives characterized by a periodic pattern, including but not limited to a sinusoidal shape with peaks and valleys when viewed edgewise, to produce corrugated, strip-cut, shredded and granulated products. Each knife 20 projects radially inward in a direction generally opposite the direction of rotation of the impeller 14 within the cutting head 12, and defines a cutting edge at its innermost radial extremity. The cutting head 12 further comprises lower and upper support members, represented in FIG. 2 as rings 22 and ring 24, to and between which circumferentially-spaced support segments, referred to herein as shoes 26, are secured with fasteners 36.

As also represented in FIG. 2, a knife 20 can be associated with each shoe 26, in which case the shoes 26 may be referred to as cutting stations of the cutting head 12. The knives 20 of the cutting head 12 are represented in FIG. 2 as being individually secured with clamping assemblies 28 to their respective shoes 26. Each clamping assembly 28 includes a knife holder 30 mounted between the support rings 22 and 24, and a clamp 32 positioned on the radially outward-facing side of the holder 30 to secure a knife 20 thereto. Each knife 20 is supported by a radially outer surface of one of the knife holders 30, and the corresponding clamp 32 overlies the holder 30 so that the knife 20 is between the outer surface of the holder 30 and a radially inward surface of the clamp 32 that faces the holder 30. By forcing the clamp 32 toward the holder 30, the clamp 32 applies a clamping force to the knife 20 adjacent its cutting edge. FIG. 2 further shows a gate 40 secured to each shoe 26. A food product crosses the gate 40 prior to encountering the knife 20 mounted to the succeeding shoe 26, and together the cutting edge of a knife 20 and a trailing edge of the preceding gate 40 define a gate opening that determines the thickness of a slice produced by the knife 20.

FIG. 3 is an isolated view of a particular but nonlimiting example of an impeller 14 that has been used with Model CC® slicing machines, including the type of machine 10 schematically represented in FIG. 1. FIG. 3 depicts that additional sets of mounting holes 34 may be provided to enable different numbers of paddles 13 to be mounted on the impeller 14 at alternative locations. The placement of the mounting holes 34 may also determine the orientation or pitch of each paddle face relative to a radial of the impeller 13. As used herein, paddle face refers to the surface of a paddle 13 disposed on the leading surface of the paddle 13 (i.e., facing the direction of impeller rotation) and therefore engages and directs products toward and against the knives 20 of the cutting head 12 as the products move in a radially outward direction of the impeller 14 under the influence of centrifugal forces resulting from the rotation of the impeller 14.

While the centrifugal-type Model CC® machines have performed extremely well for their intended purpose, further improvements are continuously desired and sought, including improvements relating to the maintenance of the machines. A nonlimiting example is the replacement of the knives 20, whose cutting edges are vulnerable to damage, for example, from impacts with rocks, sand, and other foreign debris that often accompany and may be imbedded in food products such as potatoes. FIGS. 3 and 4 represent one such approach by equipping the paddles 13 of the impeller 14 with multiple posts 42 located and spaced along outer radial extents of the paddles 13, creating gaps 44 between adjacent posts 42 through which rocks and other foreign debris can pass around the outermost radial extents of the paddles 13 and subsequently exit the cutting head 12 without damaging the paddles 13 of the impeller 14 or the knives 20 of the cutting head 12. The posts 42 can be replaceable, such as by being threading into a face at the outer radial extent of each paddle 13. The uppermost and lowermost extents of the paddles 13 are represented in FIGS. 3 and 4 as lacking a post 42 and instead as having what may be referred to as upper and lower shear edges 46 and 48, which inhibit accumulation of debris at the perimeter of the cutting head 12.

BRIEF DESCRIPTION OF THE INVENTION

The present invention provides, at least in part, machines for cutting products, including but not limited to centrifugal-type slicing machines adapted for slicing food products, and to impellers suitable for use in such machines.

According to one aspect, an impeller is provided that is adapted to be coaxially mounted within a cutting head for rotation about an axis of the cutting head. The impeller includes a lower plate having an upper surface, a lower surface, and a perimeter, and paddles configured with the lower plate to direct material placed on the lower plate in a radially outward direction of the impeller when the impeller is rotated. At least a first paddle has an outer radial extent that defines an outermost radial extent of the first paddle adjacent the perimeter of the lower plate. At least a first recess is located in the lower plate, is continuous between the upper and lower surfaces of the lower plate, and is contiguous with the perimeter of the lower plate. The first recess extends through the lower plate to define a passageway connected to the upper surface to enable debris at the upper surface to exit the impeller through the passageway. A chute is located at the outer radial extent of the first paddle and defines a first opening adjacent the first paddle, a second opening adjacent the first recess, and a passageway within the chute and between the first and second openings through which the debris passes before exiting the impeller through the passageway of the first recess.

According to another aspect, a cutting machine is provided that includes an annular-shaped cutting head and an impeller coaxially mounted within the cutting head for rotation about an axis of the cutting head in a rotational direction relative to the cutting head. The cutting head has multiple knives each extending radially inward toward the impeller in a direction opposite the rotational direction of the impeller. The impeller includes a lower plate having an upper surface, a lower surface, and a perimeter, and paddles configured with the lower plate to direct material placed on the lower plate in a radially outward direction of the impeller when the impeller is rotated. At least a first paddle has an outer radial extent that defines an outermost radial extent of the first paddle adjacent the perimeter of the lower plate. At least a first recess is located in the lower plate, is continuous between the upper and lower surfaces of the lower plate, and is contiguous with the perimeter of the lower plate. The first recess extends through the lower plate to define a passageway connected to the upper surface to enable debris at the upper surface to exit the impeller through the passageway. A chute is located at the outer radial extent of the first paddle and defines a first opening adjacent the first paddle, a second opening adjacent the first recess, and a passageway within the chute and between the first and second openings through which the debris passes before exiting the impeller through the passageway of the first recess.

According to yet another aspect, an impeller is provided that is adapted to be coaxially mounted within a cutting head for rotation about an axis of the cutting head. The impeller includes a lower plate having an upper surface, a lower surface, and a perimeter, and paddles configured with the lower plate to direct material placed on the lower plate in a radially outward direction of the impeller when the impeller is rotated. At least a first paddle has an outer radial extent that defines an outermost radial extent of the first paddle adjacent the perimeter of the lower plate. The first paddle has a leading side that defines a paddle face that has an arcuate convex shape.

Technical aspects of impellers and cutting machines equipped therewith as described above may include the ability to reduce the likelihood of damage to knives and knife holders of such machines from impacts with rocks and other foreign debris that can accompany and may be imbedded in a material or product being cut, as a nonlimiting example, food products such as potatoes.

Other aspects and advantages of this invention will be appreciated from the following detailed description.

DETAILED DESCRIPTION OF THE INVENTION

Figure 1:
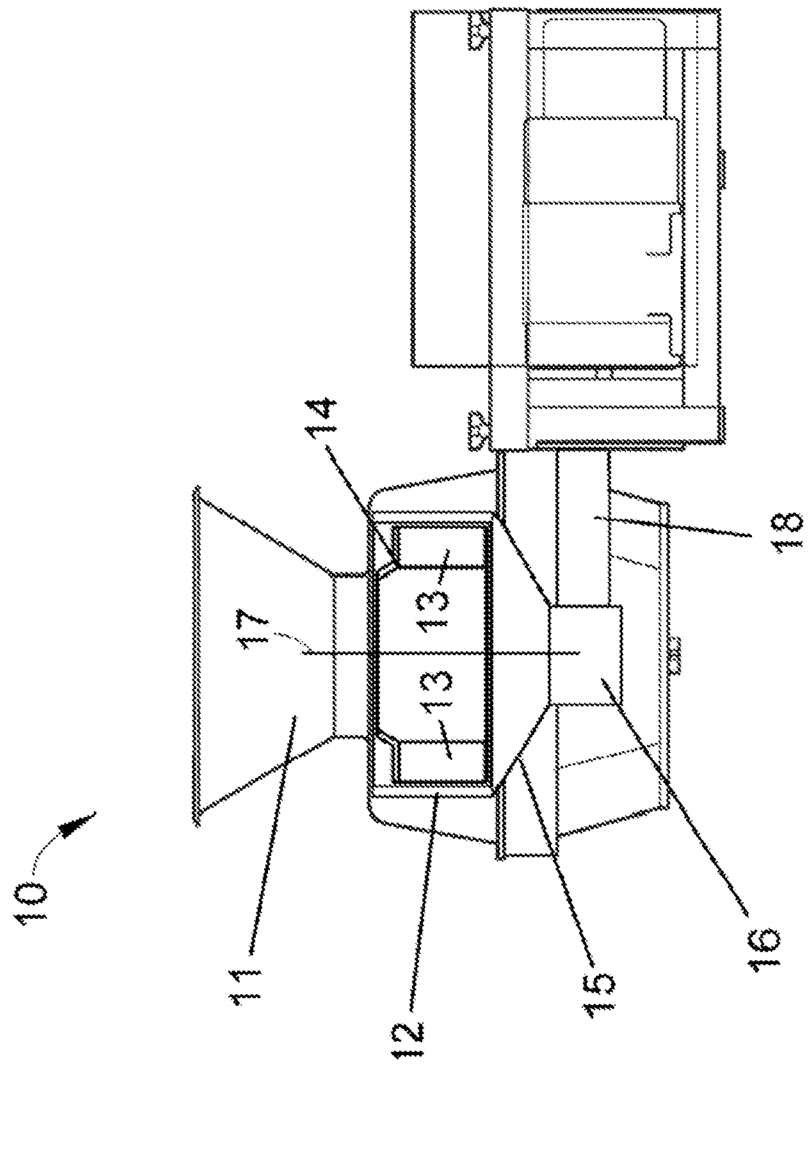
FIG. 1 PRIOR ART
FIG. 1 schematically represents a side view in partial cross-section of a centrifugal-type slicing machine known in the art.

The intended purpose of the following detailed description of the invention and the phraseology and terminology employed therein is to describe what is shown in the drawings, which include the depiction of one or more nonlimiting embodiments of the invention, and to describe certain but not all aspects of the embodiment(s) depicted in the drawings. The following detailed description also identifies certain but not all alternatives of the embodiment(s) depicted in the drawings. Therefore, the appended claims, and not the detailed description, are intended to particularly point out subject matter regarded as the invention, including certain but not necessarily all of the aspects and alternatives described in the detailed description.

Figure 2:
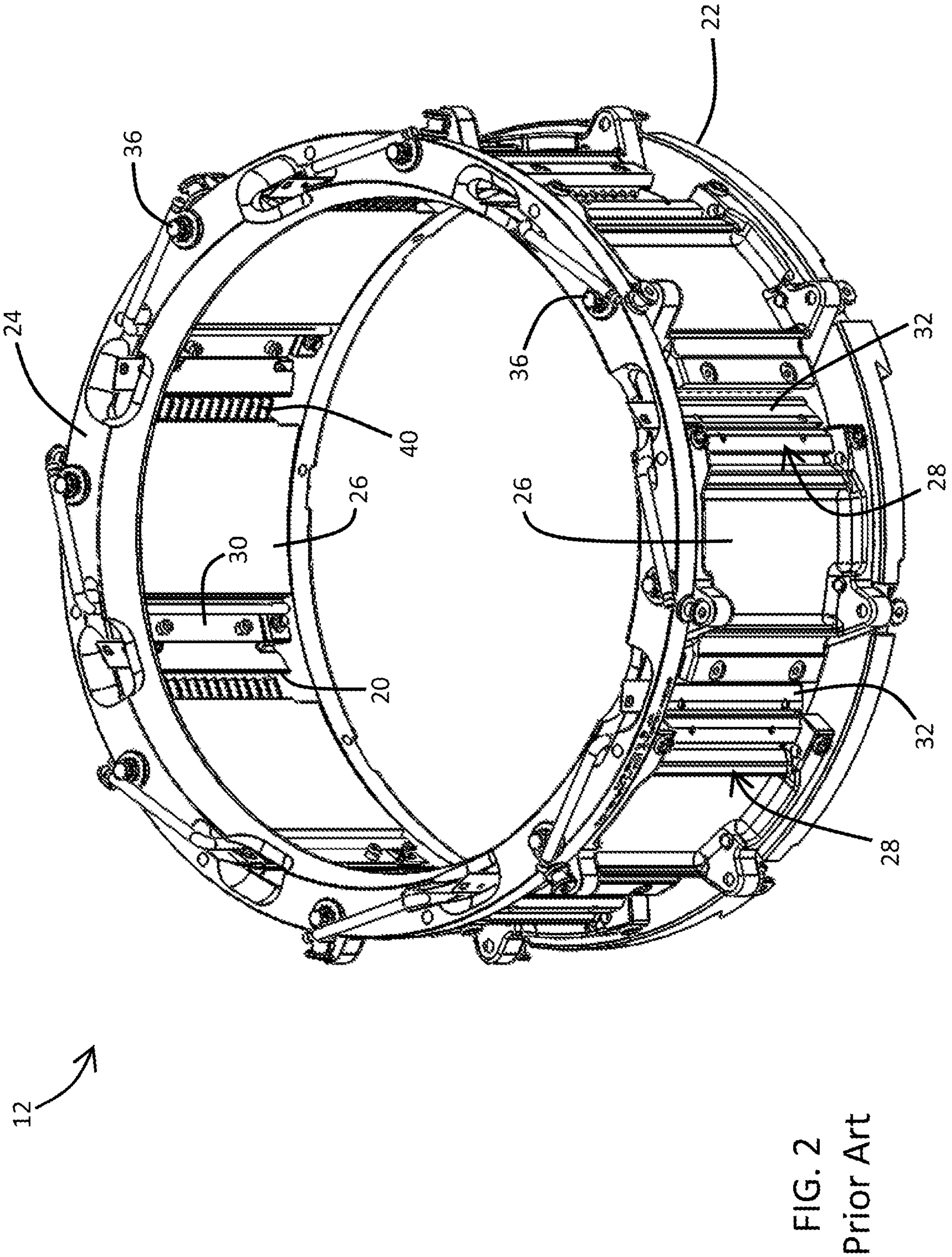
FIG. 2 Prior Art
FIG. 2 is a perspective view representing details of a cutting head that has found use in slicing machines of the type represented in FIG. 1.
Figure 4:
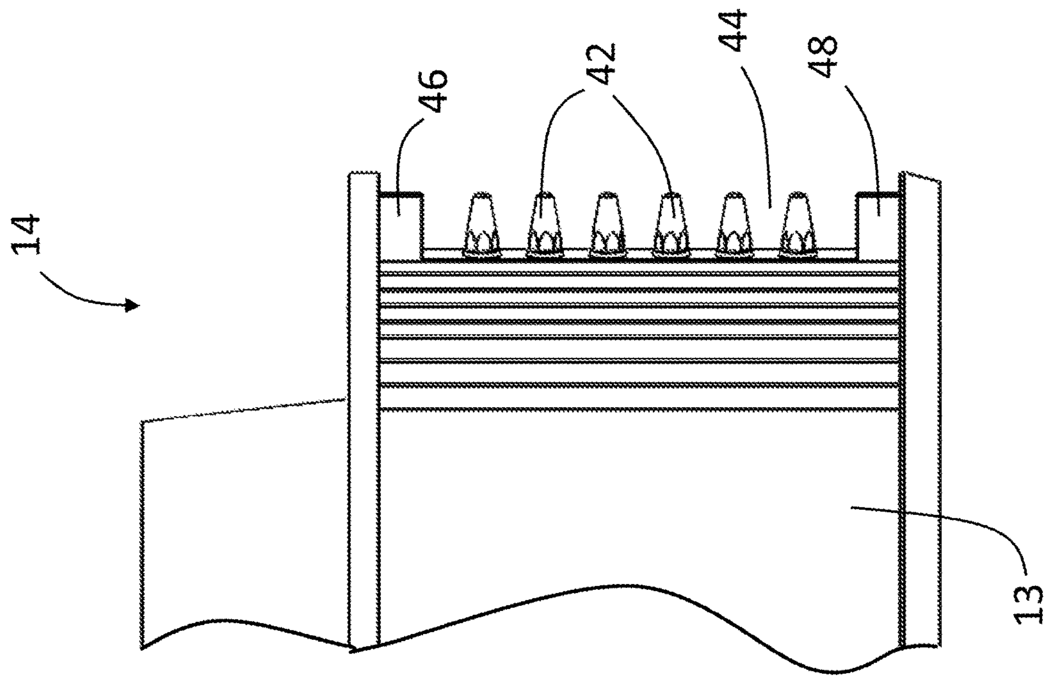
FIG. 4 Prior Art
FIG. 4 is a detailed side view of one paddle mounted to the impeller of FIG. 3.
Figure 3:
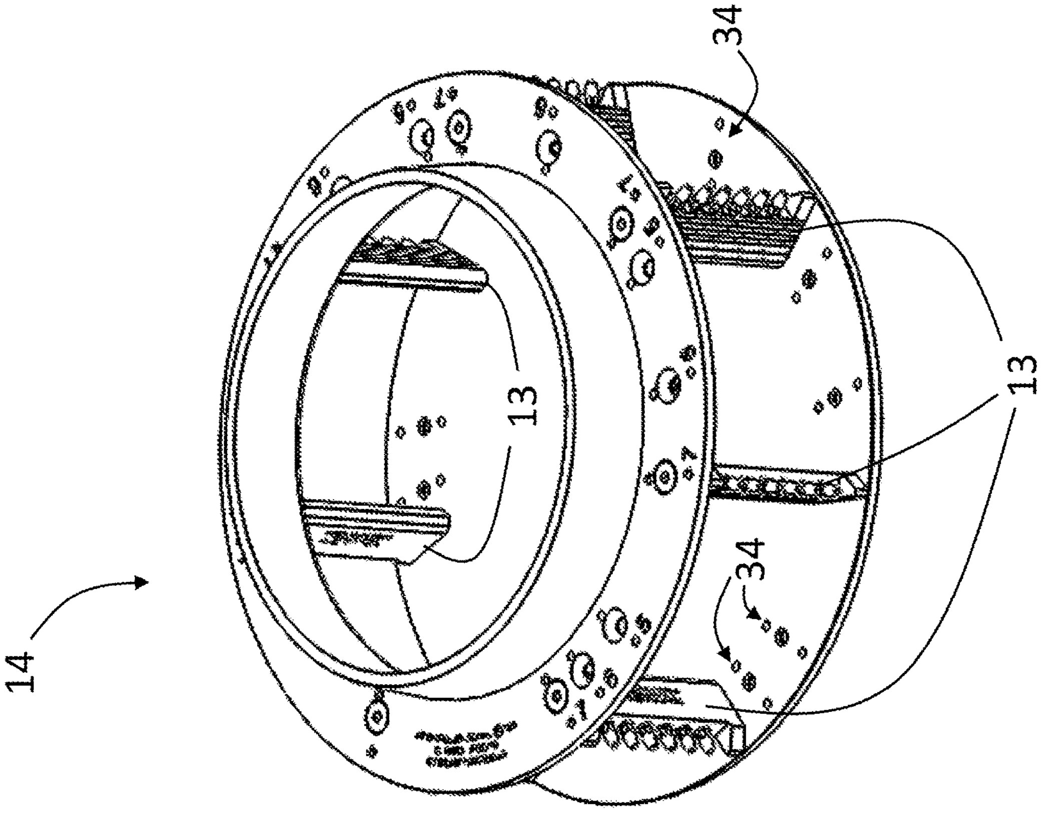
FIG. 3 Prior Art
FIG. 3 is a perspective view representing an impeller of a type that has found use in slicing machines of the type represented in FIG. 1 and the cutting head of FIG. 2.

FIGS. 5 through 16 schematically represent nonlimiting embodiments of impellers and components thereof that are capable of use with a variety of cutting machines, including the centrifugal-type slicing machine 10 depicted in FIG. 1 and the cutting head of FIG. 2, and in some instances may be a replacement or modification of an impeller for such machines. As a matter of convenience, nonlimiting embodiments of the impellers and components thereof will be illustrated and described hereinafter in reference to the slicing machine 10 of FIG. 1 equipped with an annular-shaped cutting head 12 as described in reference to FIGS. 1 and 2, and as such the following discussion will focus primarily on certain aspects of the impellers that will be described in reference to the slicing machine 10 and cutting head 12, whereas other aspects not discussed in any detail below may be, in terms of structure, function, materials, etc., essentially as was described in reference to the impeller of FIGS. 1, 3, and 4. However, it will be appreciated that the teachings of the invention are also generally applicable to other types of cutting machines. Moreover, though such machines are particularly well suited for slicing food products, it is within the scope of the invention that impellers described herein could be utilized in cutting machines that cut a wide variety of other types of materials.

To facilitate the description provided below of the embodiments represented in the drawings, relative terms may be used in reference to the orientation of an impeller within the cutting head 12, as represented by the cutting head 12 and impeller 14 of the machine 10 represented in FIG. 1. On the basis of the coaxial arrangement of the cutting head 12 and impeller 14 in FIG. 1, relative terms including but not limited to "axial," "circumferential," "radial," etc., and related forms thereof may also be used below to describe the nonlimiting embodiments represented in the drawings. All such relative terms are useful to describe the illustrated embodiments but should not be otherwise interpreted as limiting the scope of the invention. Furthermore, as used herein, "leading" (and related forms thereof) refers to a position on an impeller that is ahead of or precedes another in the direction of rotation of the impeller when assembled with and rotating within a cutting head, whereas "trailing" (and related forms thereof) refers to a position on the impeller that follows or succeeds another relative to the direction of the impeller's rotation.

Figure 5:
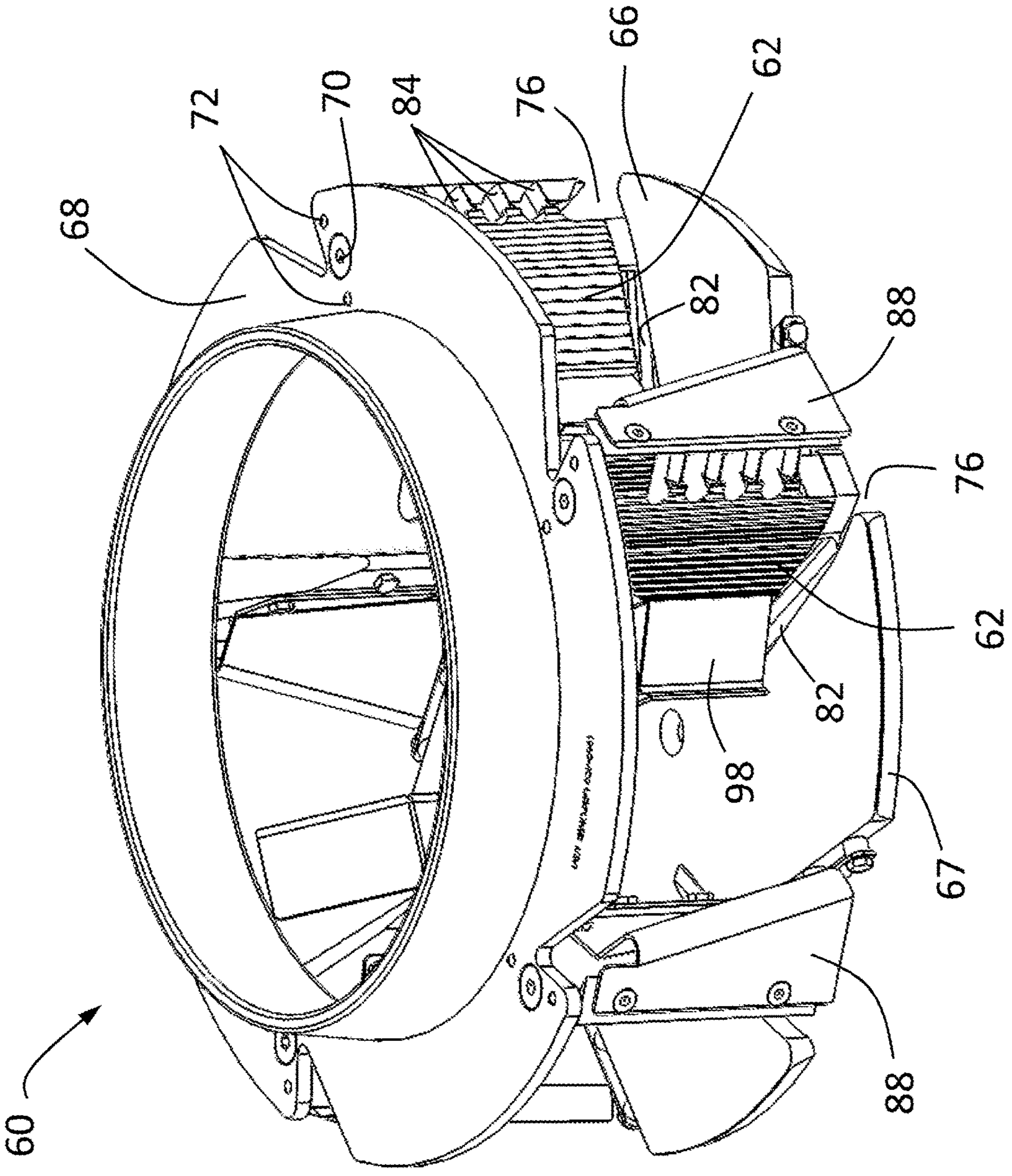
FIG. 5 is a perspective view representing a nonlimiting embodiment of an impeller capable of use in a centrifugal-type slicing machine of the type represented in FIG. 1 and the cutting head of FIG. 2.
Figure 6:
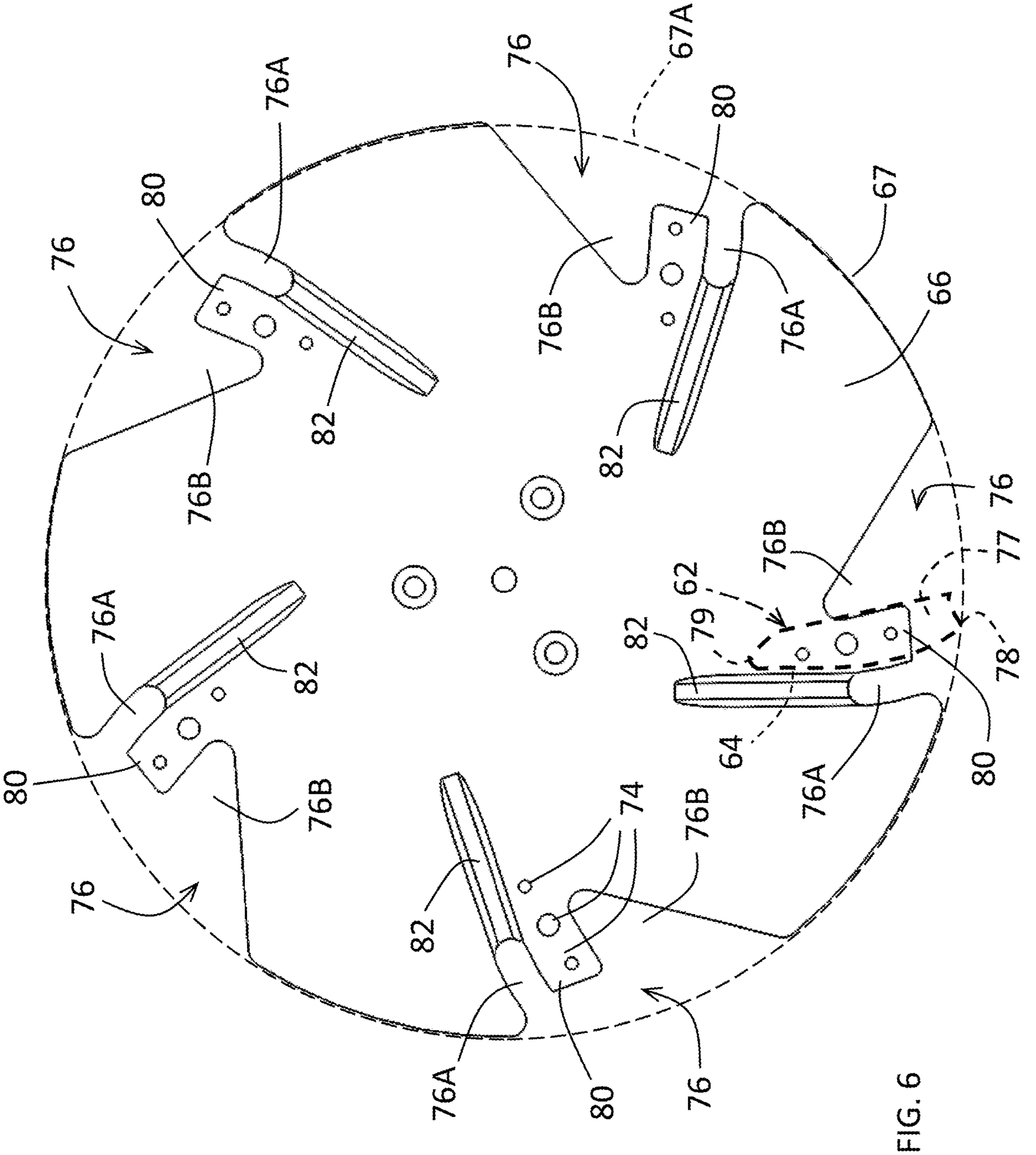
FIG. 6 is an isolated plan view of a lower plate of the impeller of FIG. 5.
Figure 7:
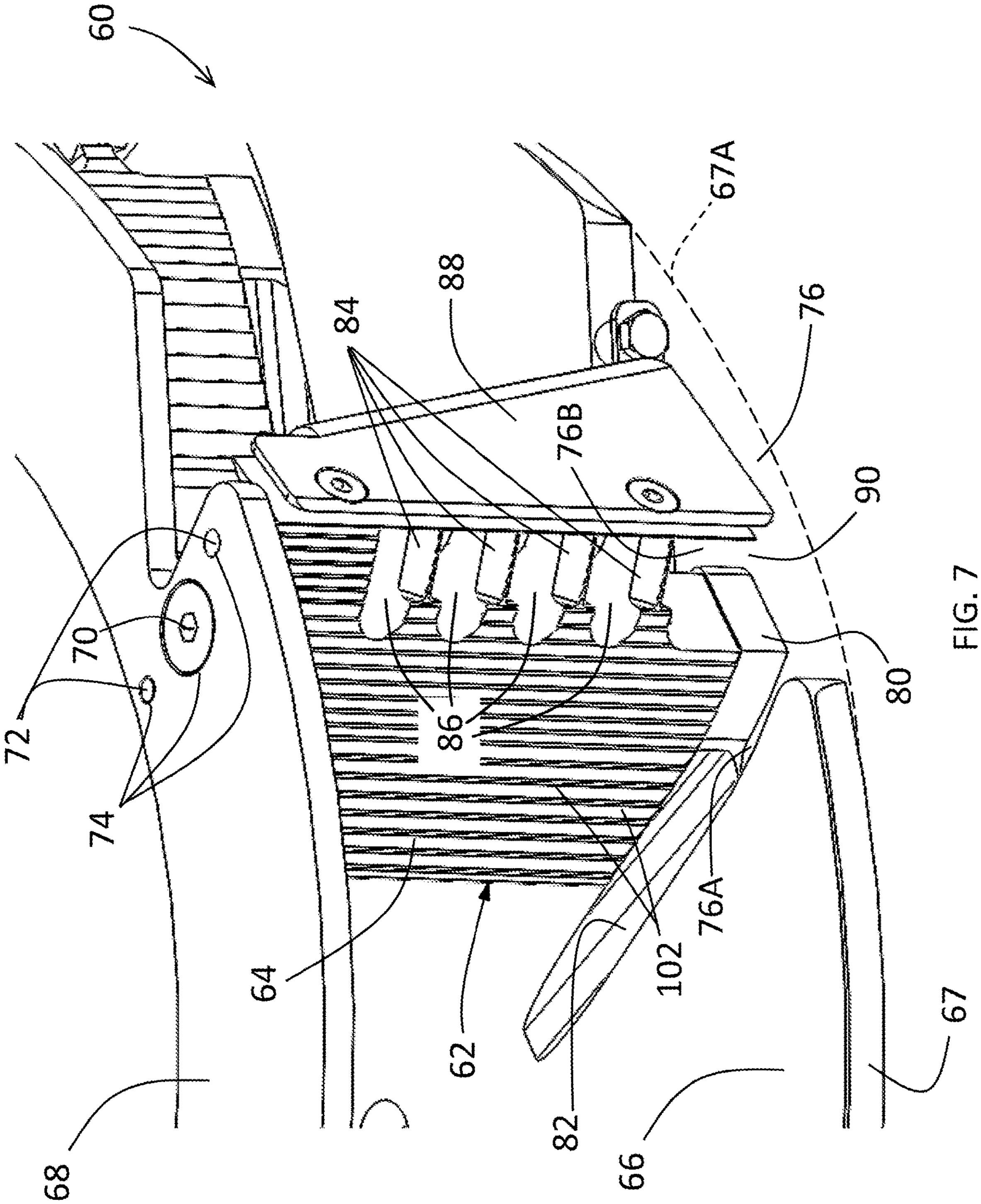
FIG. 7 is a detailed perspective view of the impeller of FIG. 5 and depicts a paddle and chute of the impeller.

FIG. 5 schematically represents an impeller 60, FIG. 6 schematically represents a lower plate 66 of the impeller 60, and FIG. 7 schematically represents a portion of the impeller 60 in accordance with a first nonlimiting embodiment of the present invention. Similar to the impeller 14 of FIGS. 1, 3, and 4, the impeller 60 has generally radially-oriented paddles 62 with paddle faces 64 (FIG. 7) located at their leading surfaces so that the paddle faces 64 engage and direct product radially outward against knives 20 of the cutting head 12 as the impeller 60 rotates about its axis of rotation within the cutting head 12. More particularly, centrifugal forces created by the rotation of the impeller 60 cause a product that has entered the impeller 60 to move radially outward, and once the product encounters a paddle 62 its radially outward movement is directed by the paddle face 64 toward the cutting head 12. The paddles 62 shown in the nonlimiting embodiment of FIG. 5 are disposed between the lower plate 66 and an annular-shaped upper plate 68. The impeller 60 is represented as being constructed of individually formed paddles 62 mounted and secured between the lower and upper plates 66 and 68, though alternatively the paddles 62 could be cast as integral components of the lower and/or upper plates 66 and 68. If the former, the impeller 60 and its components can be formed by processes other than casting and formed of various different materials.

In the nonlimiting embodiment shown in FIGS. 5 through 7, the paddles 62 are shown as individually mounted with bolts 70 and pins 72 to a corresponding set of mounting holes 74 (FIGS. 6 and 7) machined in the plates 66 and 68, though it is also within the scope of the invention that any of the paddles 62 could be directly attached to only one of the lower and upper plates 66 and 68 and indirectly attached to the other plate 66 or 68 as a result of the lower and upper plates 66 and 68 being coupled together by any suitable means, for example, posts or connecting rods. The placement of the mounting holes 74 determines at least in part the orientation or pitch of the paddle face 64 of each paddle 62 relative to a radial of the impeller 60. The placement of the mounting holes 74 can be chosen so that the pitches of the paddle faces 64 are negative, neutral, or positive relative to a radial of the impeller 60.

FIG. 6 shows the lower plate 66 of the impeller 60 as defining a perimeter 67 that, but for interruptions by recesses 76 in the plate 66, would define a continuous circumference 67A of the plate 66. The recesses 76 are continuous between the upper and lower surfaces of the lower plate 66 and contiguous with radially outermost edges of the lower plate 66 that coincide with the circumference 67A, such that the recesses 76 are open at the perimeter 67 of the lower plate 66 and define what may be referred to as slots in the perimeter 67. Each recess 76 extends through the lower plate 66 to define a passageway connected to the upper surface of the lower plate 66 through which foreign debris at the upper surface is able to exit the impeller 60. As used herein, the terms "foreign debris" and "debris" include rocks and any other types of contaminants that may accompany and/or be imbedded in a material or product being cut with the use of the impeller 60.

The location of each recess 76 at the perimeter 67 of the lower plate 66 corresponds with the location of a corresponding one of the paddles 62. Each recess 76 is depicted as comprising at least two radially-inward projecting recess portions 76A and 76B. As represented by an outline of a paddle 62 in FIG. 6, the paddles 62 may each be mounted to the lower plate 66 so that each is between the recess portions 76A and 76B of its corresponding recess 76, with the recess portion 76A being on the leading side of the paddle 62 and the recess portion 76B being on the trailing side of the paddle 62. As also represented in FIG. 6, the recess portions 76A and 76B may be partially separated by a portion of the lower plate 66 which generally defines a peninsula 80 that extends toward but, in the nonlimiting embodiment shown, does not intersect the circumference 67A of the perimeter 67. Each paddle 62 may be mounted to a corresponding one of the peninsulas 80 so that an outer radial extent 77 of each paddle 62 radially protrudes beyond its peninsula 80 and over the recess 76, and an outermost radial extent 78 of each paddle 62 is in close proximity to the circumference 67A of the perimeter 67 or, as represented in FIG. 6 may intersect the circumference 67A of the perimeter 67.

Figure 8:
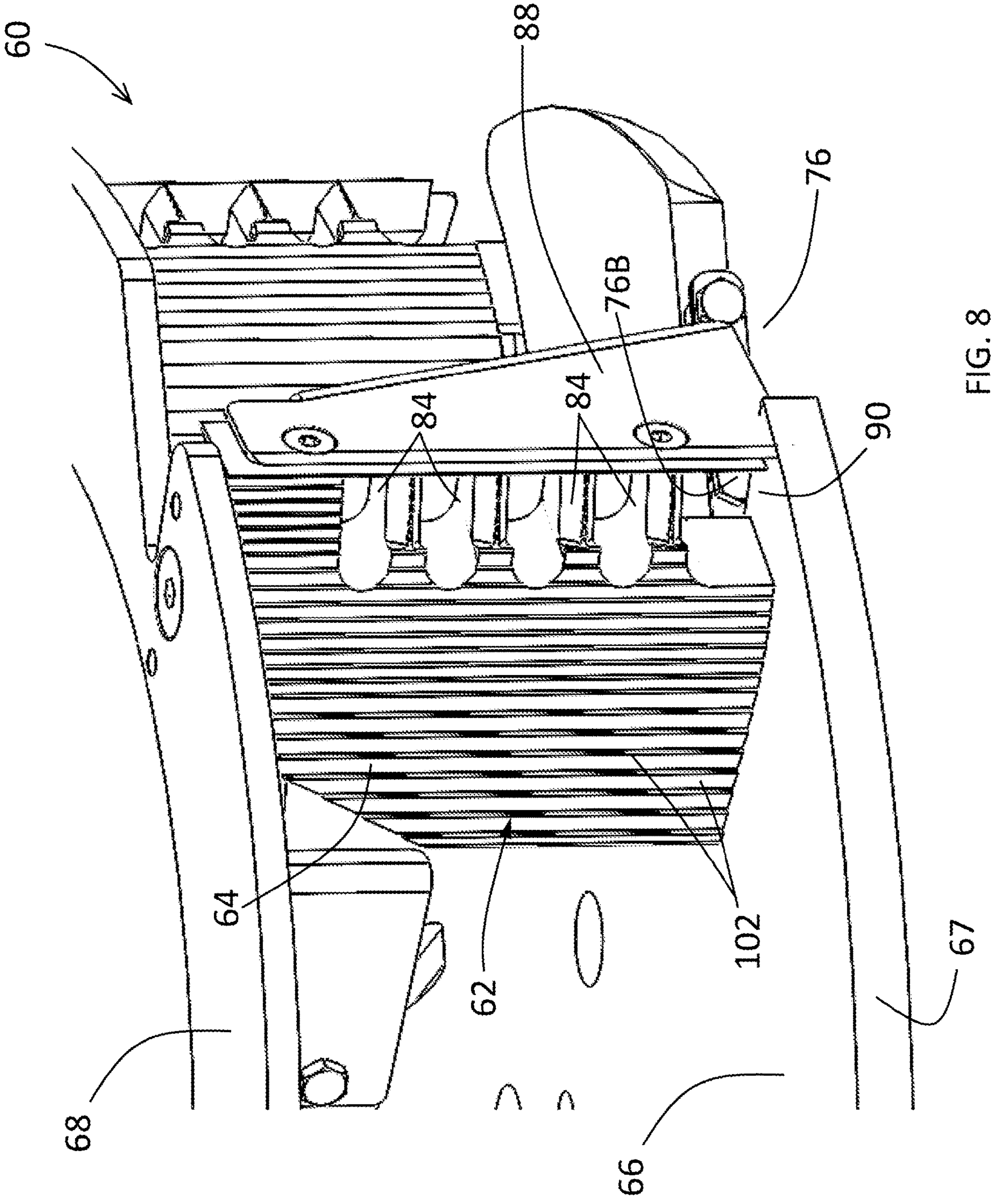
FIGS. 8 and 9 are detailed perspective views of alternative embodiments of the impeller of FIG. 5.

FIG. 6 also shows the lower plate 66 as having trenches that slope downward from the upper surface of the lower plate 66 toward the perimeter 67 of the impeller 60, creating ramps 82 that intersect the recess portions 76A that are disposed alongside and optionally contiguous with the paddle faces 64. The ramps 82 serve to capture debris and then convey such debris to the recess portions 76A. As such, the ramps 82 and recess portions 76A provide the capability of avoiding or at least reducing the risk of damage to the paddles 62 of the impeller 60 and to the knives 20 and knife holders 30 of the cutting head 12. Depending on the size of debris and how fast it travels radially outward, debris may drop downward through the recess portion 76A, represented as being smaller than the other recess portion 76B, or may continue toward the larger recess portion 76B. As seen in FIG. 6, the innermost radial extent of each ramp 82 extends beyond the innermost radial extent 79 of its corresponding paddle 62, the intersection of each ramp 82 with its corresponding recess portion 76 is approximately at a point midway between the outermost and innermost radial extents 78 and 79 of its corresponding paddle 62, and the entire paddle face 64 of the paddle 62 is contiguous with either the ramp 82 or recess portion 76A. As FIG. 5 represents a nonlimiting embodiment, it should be understood that other configurations are possible, including the number, sizes, configurations, and locations of the recesses 76 and their recess portions 76A and 76B as well as the absence of the smaller recess portions 76B, peninsulas 80, and ramps 82, as represented in FIG. 8 (in which case the outer radial extent 77 of the paddle 62 does not protrude over the recess 76).

Figure 9:
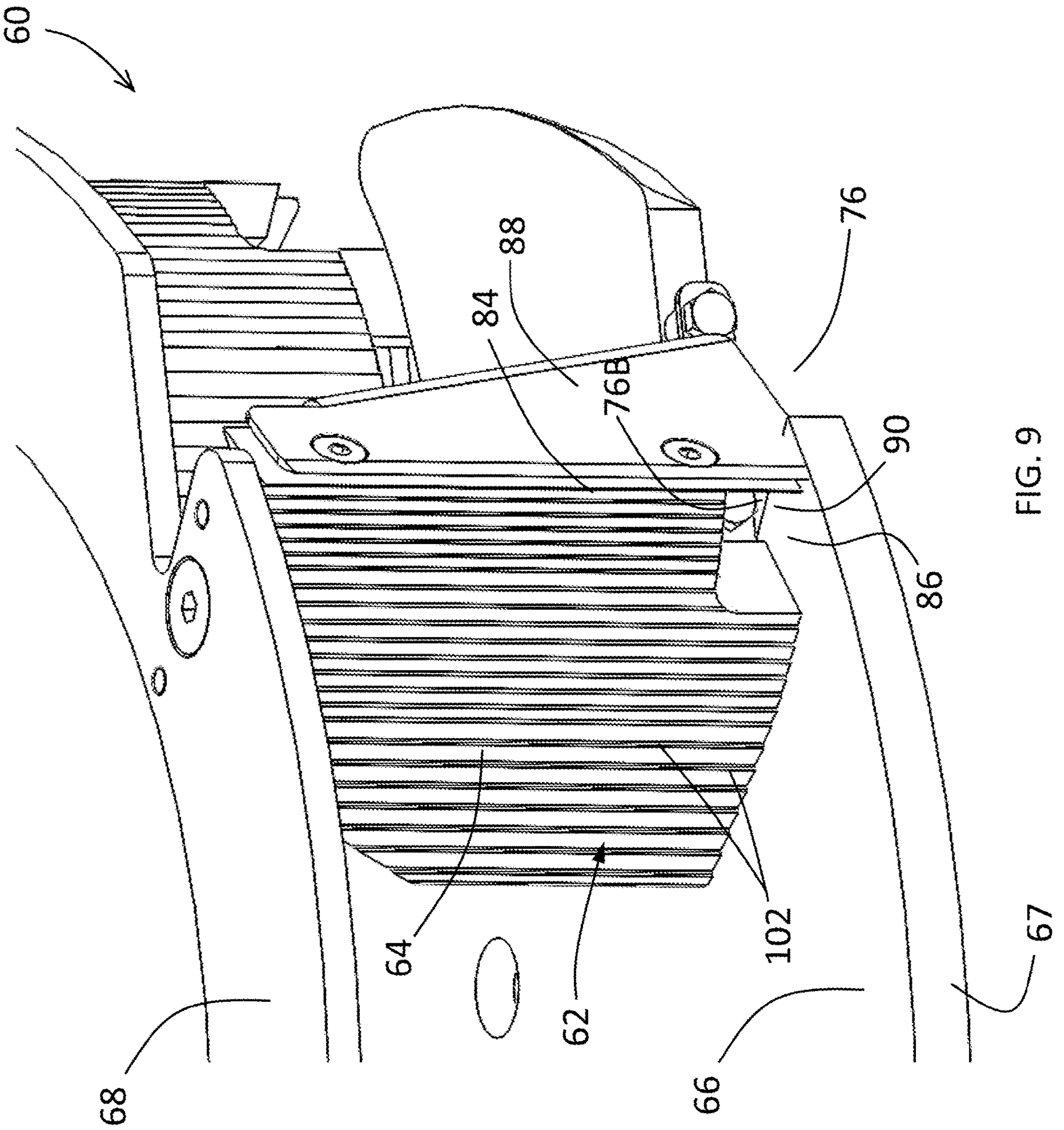

FIGS. 5 and 7 represent the outer radial extents 77 of the paddles 62 that project over the recesses 76 (labeled and depicted in FIG. 6) as equipped with multiple extensions 84 spaced along their outermost radial extents 78, forming multiple gaps 86 (FIGS. 7 and 13A) through which foreign debris can pass without damaging the paddles 62 or the knives 20 and knife holders 30 of the cutting head 12. The extensions 84 are represented as being integrally formed with the remainder of the paddles 62, for example, by machining their outer radial extents 77 to form the gaps 86, though it is also foreseeable that the extensions 84 could be separately formed and attached to the paddles 62. The distal ends of the extensions 84 define the outermost radial extent 78 of their respective paddles 62. As evident from FIGS. 5, 7, and 13A, the lowermost extent of each paddle 62 is represented as lacking an extension 84, so that the lowest gap 86 is larger than the others and defines a lower opening through which relatively large debris are able to pass in order to escape around a paddle 62 and its outer radial extent 77. As FIG. 5 represents a nonlimiting embodiment, it should be understood that other configurations are possible, including the number and locations of the extensions 84, such as represented in FIG. 9 in which effectively a single extension 84 defines only the lowest gap 86.

Figure 10:
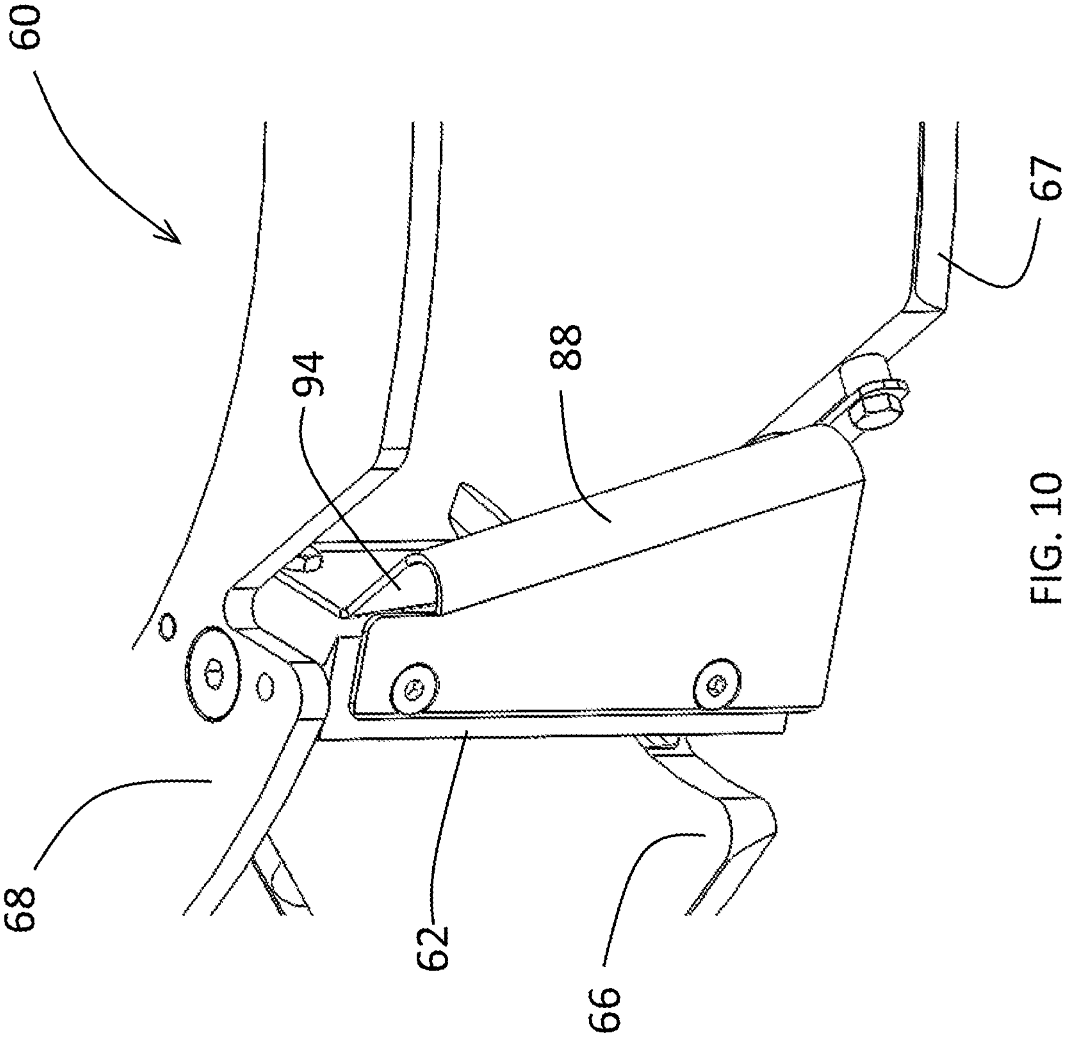
FIG. 10 is a detailed perspective view of a chute of the impeller of FIG. 5.
Figure 11C:
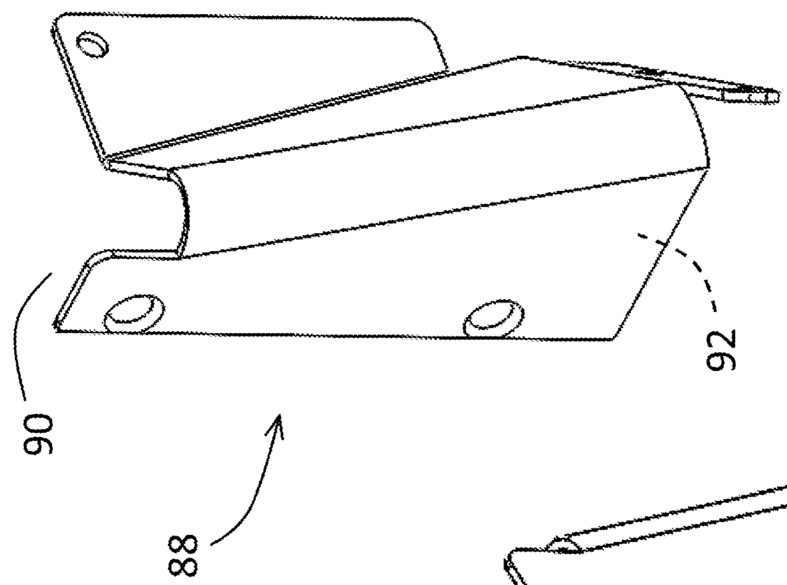
FIGS. 11A, 11B, and 11C are isolated perspective views of the chute of FIG. 10.
Figure 11B:
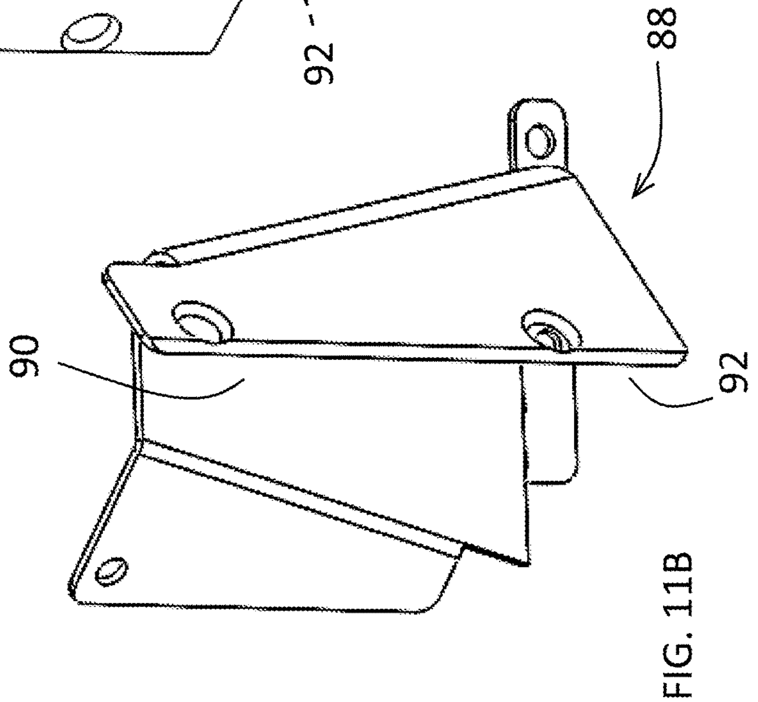
Figure 11A:
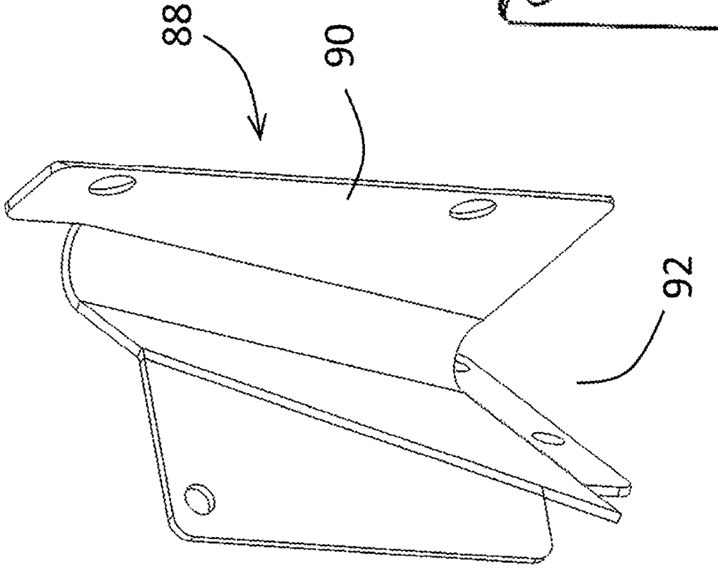
Figure 12:
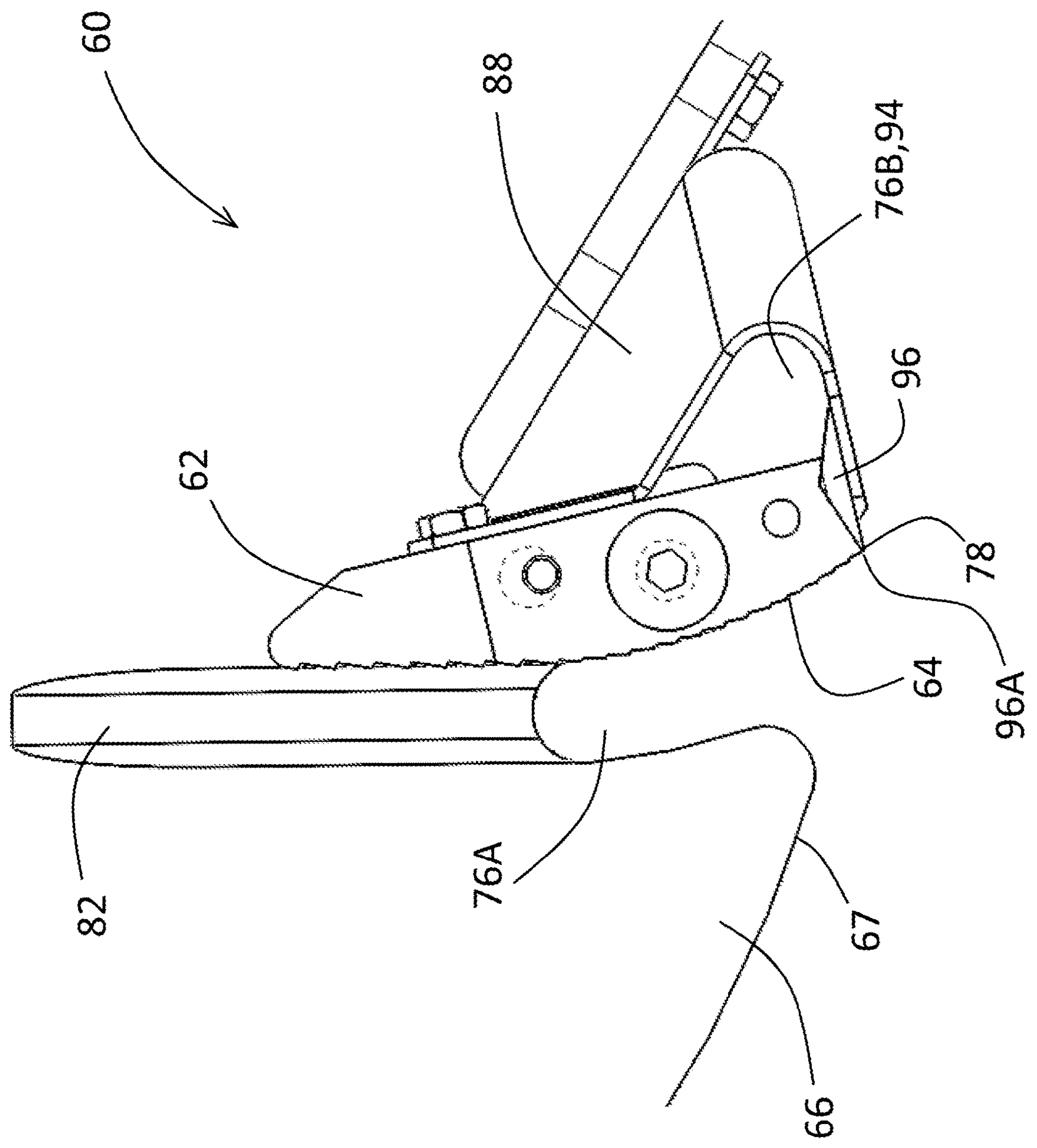
FIG. 12 is a detailed plan view showing the lower plate, a paddle, and a chute of the impeller of FIG. 5 and evidences a distinct convex curvature of the paddle face of the paddle.

In the absence of the smaller recess portion 76A or in the event that any debris does not drop down through the smaller recess portion 76A of a recess 76, FIG. 5 further shows each paddle 62 as equipped with a chute 88, with individual chutes 88 shown in more detail in FIGS. 7 through 12. The chutes 88 assist in conducting any such debris down through the larger recess portion 76B of the recess 76. The chutes 88 are shown as being attached to the outermost radial extents 78 of the paddles 62, such that the extensions 84 abut the chute 88 and the chute 88 closes the gaps 86 between the extensions 84 at their outmost extents, as is most readily apparent in FIG. 7. As seen in FIGS. 5 and 10, the chutes 88 may also be attached to the trailing faces of their paddles 62 (opposite the paddle faces 64) as well as the lower plate 66 along the edge of the larger recess portion 76B. The chutes 88 define a first opening also referred to herein as a vertical opening 90 that extends substantially the entire height of the paddle 62 to which it is attached, and a second opening also referred to herein as a horizontal opening 92 that traverses substantially the entire circumferential span of the larger recess portion 76B and, as shown in FIGS. 10 and 12, preferably encloses the larger recess portion 76B, creating a passageway within each chute 88 between its vertical and horizontal openings 90 and 92 through which debris can pass to exit the impeller 60 through the larger recess portion 76B without subsequently encountering the cutting head 12. As such, the chutes 88 and the larger recess portions 76B further promote the capability of avoiding or at least reducing the risk of damage to the paddles 62 of the impeller 60 and to the knives 20 and knife holders 30 of the cutting head 12.

As particularly evident in FIGS. 10 and 12, the upper end 94 of the chute 88 is open, creating a clear pathway through the chute 88 and the horizontal opening 92 of the chute 88 to the larger recess portion 76B in the lower plate 66 to facilitate cleaning of the impeller 60. Also depicted in FIG. 12 is a replaceable edge component 96 attached to the chute 88 along its vertical opening 90. The edge component 96 has a leading edge 96A that extends beyond the edge of the chute 88 along its vertical opening 90, and defines a ramp that deflects debris away from the perimeter 67 of the impeller 60 and toward the larger recess portion 76B to protect the cutting head 12 from excessive damage in the event that large debris may become lodged in the recess portion 76B. The edge component 96 is shown as having a triangular cross-sectional shape to define a second ramp so that, in the event that its leading edge 96A becomes damaged, the edge component 96 can be reused by simply being removed from the chute 88, rotated end to end, and reattached to the chute 88. The outermost radial extent 78 of the paddle 62 can be seen in FIG. 12 to be concave and complementary in shape to the triangular cross-sectional shape of the edge 96, enabling the edge 96 to be clamped by the chute 88 to the outermost radial extent 78 of the paddle 62.

Figure 15:
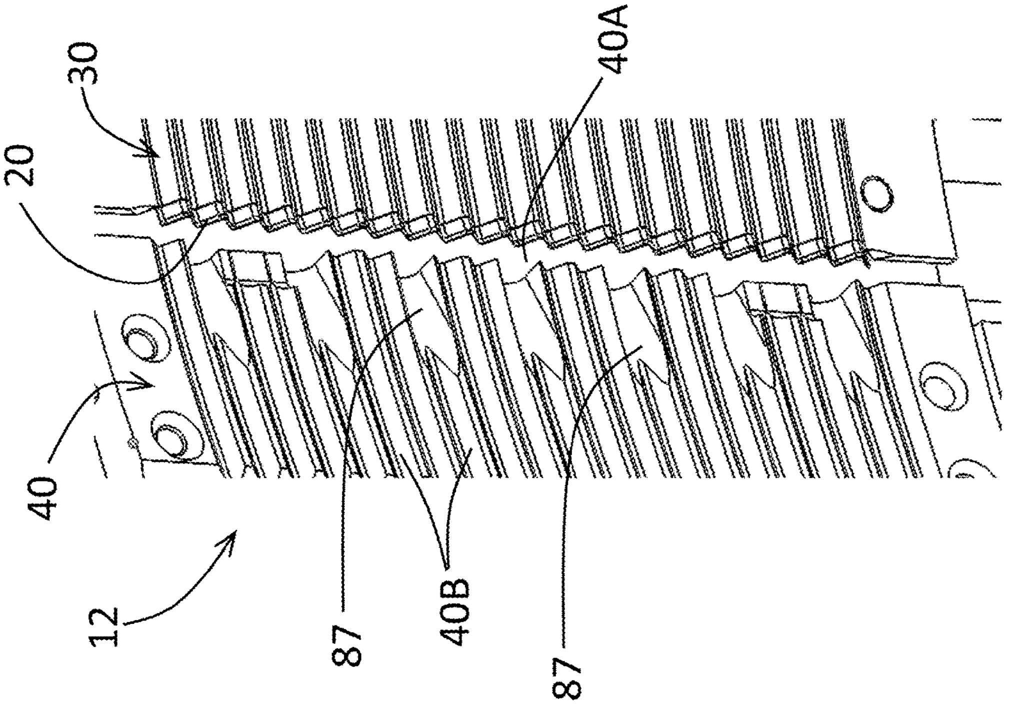
FIG. 15 is a detailed perspective view of the gate and knife of FIG. 14.
Figure 14:
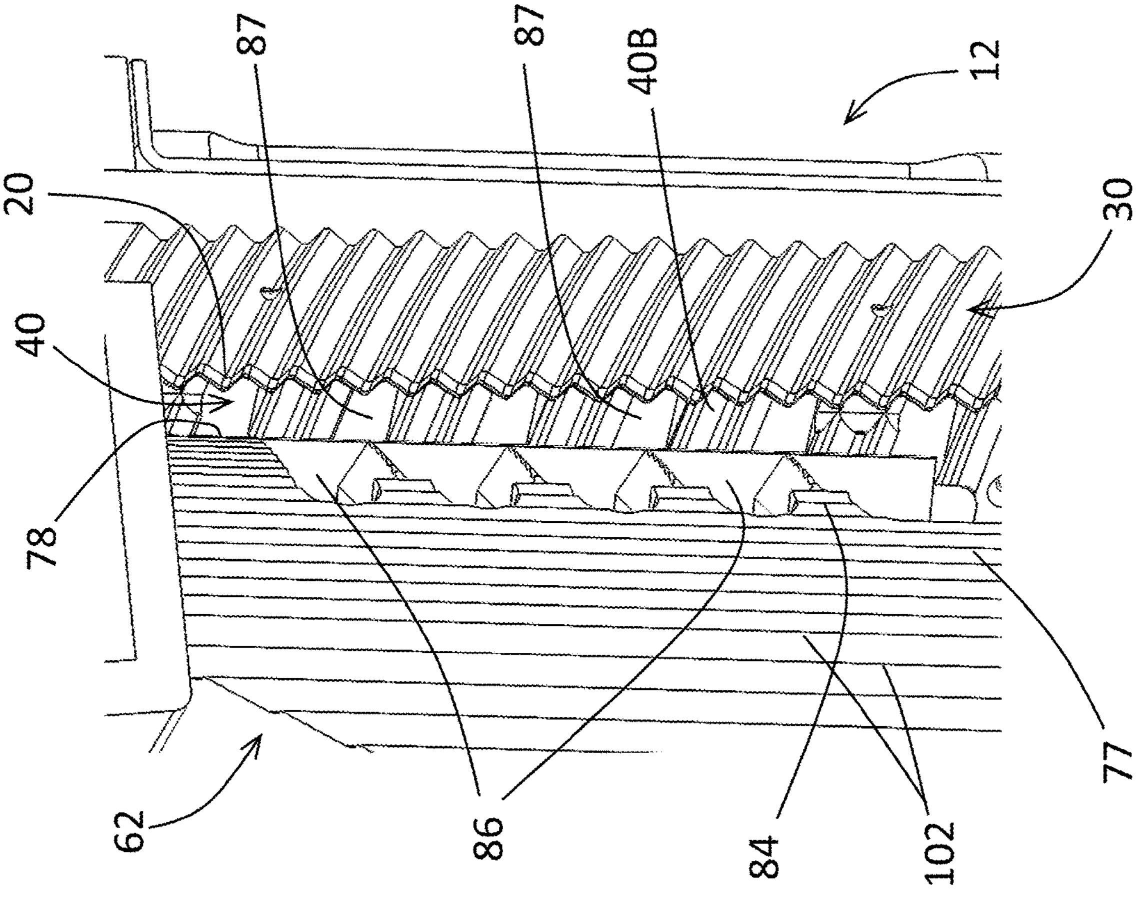
FIG. 14 is a detailed perspective view of the impeller of FIG. 5 and depicts an outer radial extent of a paddle in proximity to a gate and knife of a cutting head.

FIG. 14 is a detailed perspective view showing an outer radial extent 77 of a paddle 62 of the impeller 60 of FIG. 5 in proximity to a knife 20 and gate 40 of the cutting head 12, and FIG. 15 is a detailed perspective view of the gate 40 of FIG. 14 in proximity to the knife 20. Products cross the gate 40 prior to encountering the knife 20, and together the cutting edge of the knife 20 and the adjacent trailing edge of the gate 40 define a gate opening 40A (FIG. 15) that determines the thickness of a slice produced by the knife 20. The surface of the gate 40 has grooves 40B that are parallel to the direction that products travel across the surface of the gate 40 toward the knife 20. In FIGS. 14 and 15, the gate 40 is configured to have reliefs 87 in its surface that are deeper than the grooves 40B, contiguous with the trailing edge of the gate 50 and, as seen in FIG. 14, oppose each of the gaps 86 in the paddle 62 to promote the passage of debris therebetween.

Figure 16:
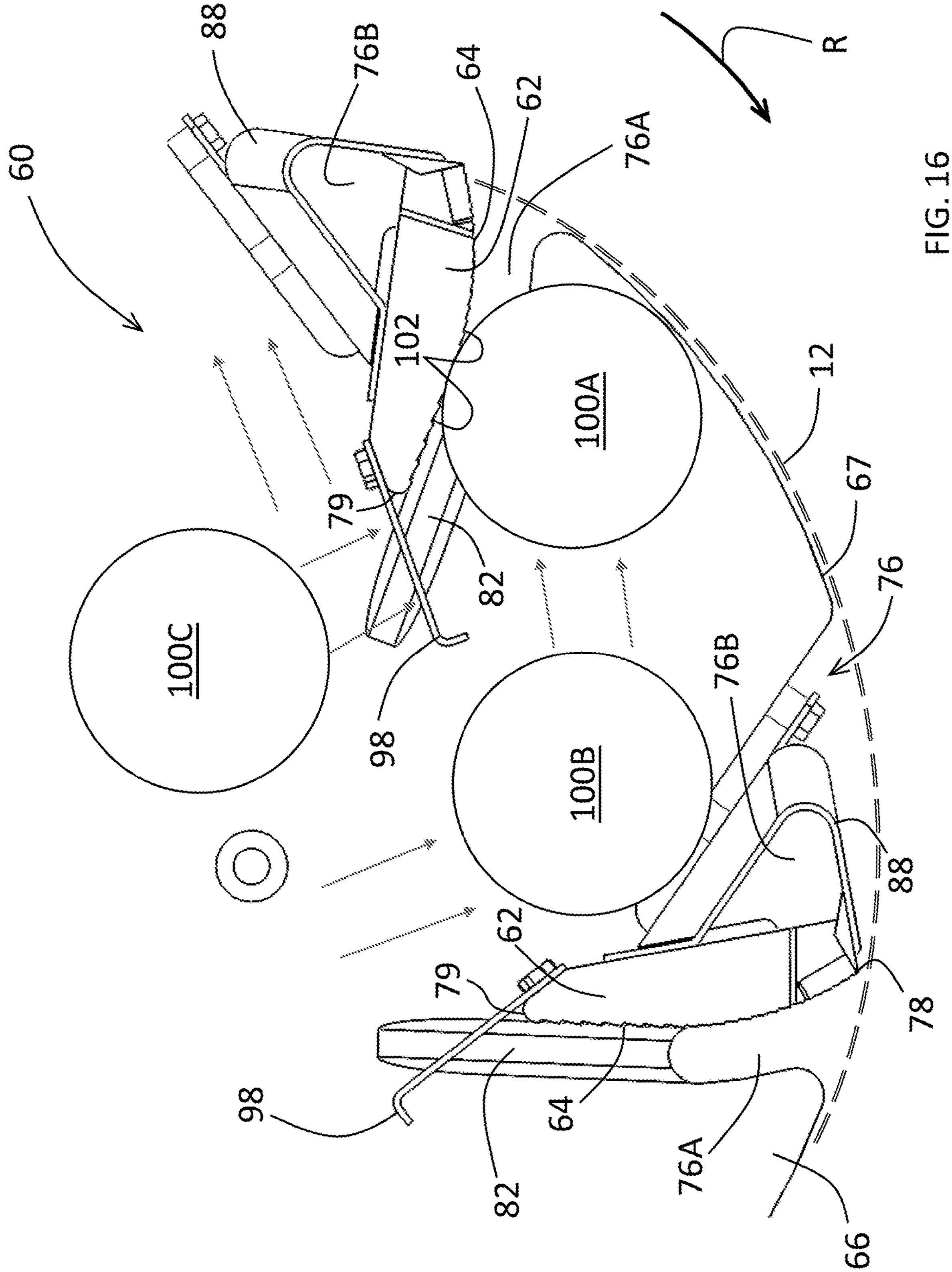
FIG. 16 is a plan view showing the lower plate, two paddles, and two chutes of the impeller of FIG. 5, and represents the movements of products within the impeller resulting from centrifugal forces on the products caused by rotation of the impeller.

FIG. 16 represents exemplary trajectories of products 100A-C that vertically enter the impeller 60 of FIG. 5 along its axis of rotation, and travel horizontally in a generally radially direction across the upper surface of the lower plate 66 under the influence of centrifugal forces generated by the rotation of the impeller 60. FIG. 16 depicts the benefits of including guides 98 that extend radially inward from the innermost radial extents 79 of the paddles 62. The guides 98 are also represented as extending in the rotational direction (R) of the impeller 60 so as to cross above the ramp 82 associated with its paddle 62. FIG. 16 represents a product 100A positioned against the paddle face 64 of a paddle 62 to undergo slicing by knives (not shown) of the cutting head 12, whose interior surface is represented by a dashed line that roughly coincides with the perimeter 67 of the impeller 60. The guide 98 attached to the paddle 62 contacted by the product 100A being sliced and the guide 98 attached to the paddle 62 leading (rotationally ahead of) the product 100A cooperate to control the direction in which the next product 100B approaches and eventually contacts the product 100A being sliced, namely, the product 100B approaches the product 100A in a direction opposite the rotational direction R of the impeller 60 to assist in holding and stabilizing the product 100A against its paddle 62 and against the interior surface of the cutting head 12 as the product 100A is being sliced, thereby reducing the likelihood that the product 100B will push the product 100A away from the paddle 62 or cutting head 12. The product 100C, which might also otherwise push the product 100A away from its paddle 62, is instead deflected by a guide 98 toward the paddle 62 that trails (is rotationally behind) the paddle 62 engaging the product 100A.

Figure 13B:
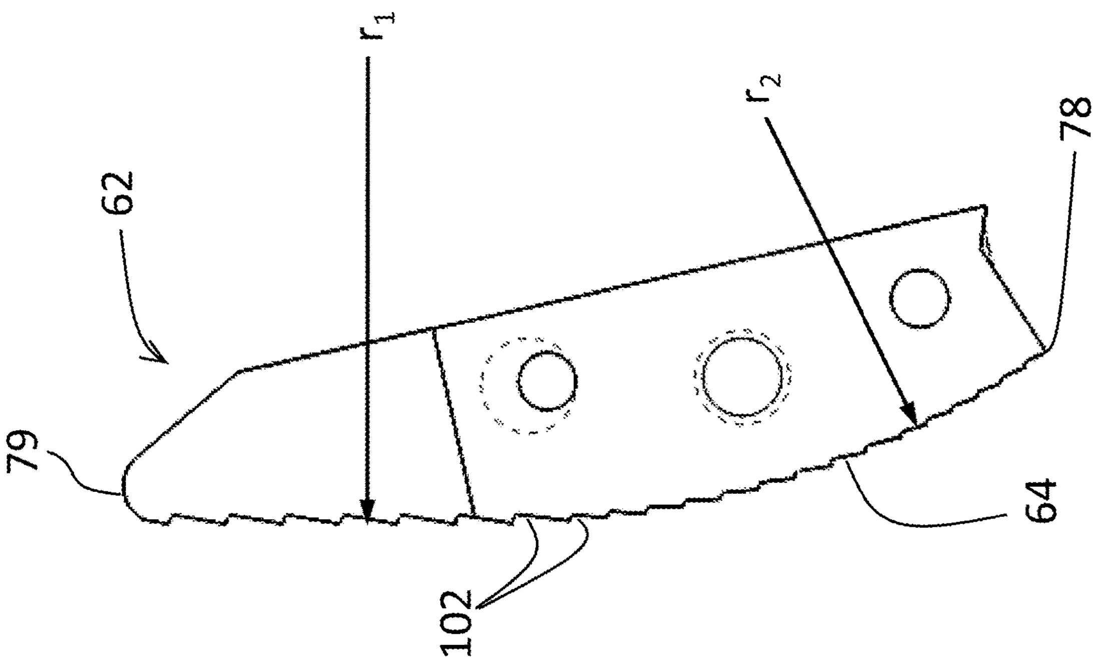
FIGS. 13A and 13B are isolated perspective and plan views, respectively, of a paddle of the impeller of FIG. 5.
Figure 13A:
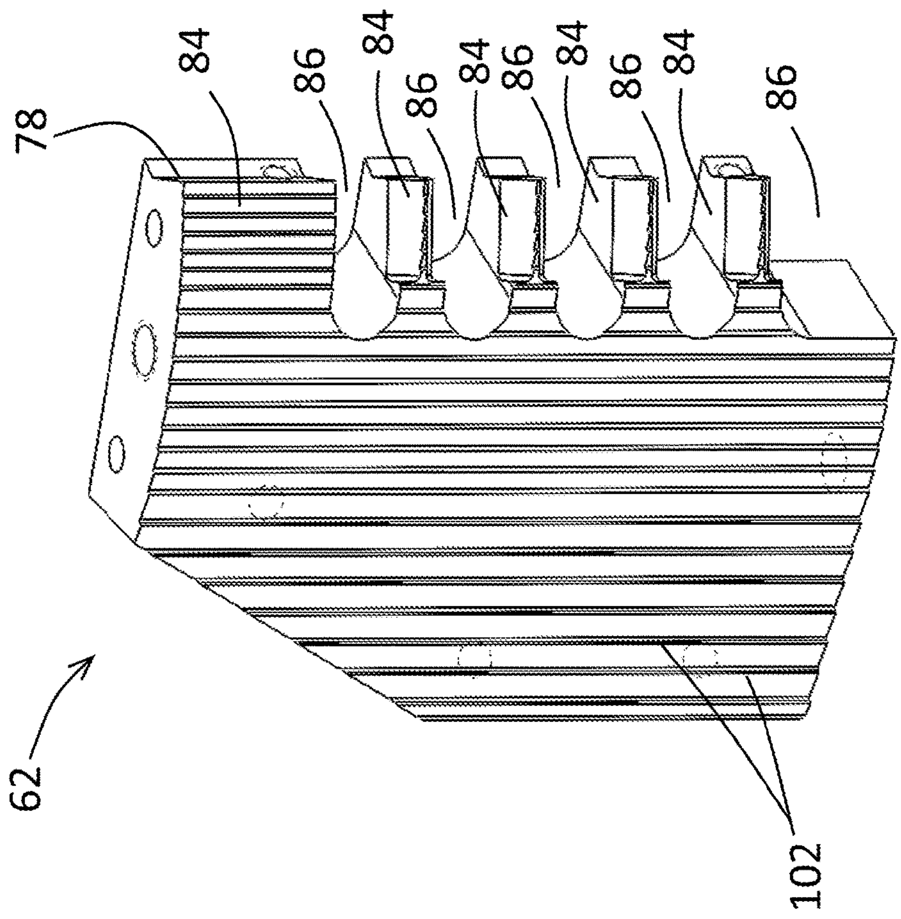

FIG. 16 further evidences the effect of forming the paddle faces 64 of the paddles 62 to have an arcuate convex shape, as particularly evident in the isolated view of a paddle 62 in FIG. 13B. The arcuate convex shape of the paddle face 64 is tailored to promote a more constant force that holds products against the interior surface of the cutting head 12 while each product is being successively sliced by knives (not shown) along the circumference of the cutting head 12. Each product during slicing is subjected to a centrifugal force resulting from the rotation of the impeller 60 and counteracted with the interior surface of the cutting head 12 by a force that is normal to the interior surface of the cutting head 12. Sufficient force is necessary to produce accurate and repeatable slices, whereas excessive force may damage the product being sliced. As the size of a product decreases during slicing, its weight also decreases and therefore the centrifugal force decreases. Assuming a paddle face 64 at a constant angle to the perimeter 67 of the lower plate 66, as the size of the product decreases the angle of the tangential paddle contact also decreases, causing the force applied by the paddle 62 to the product to decrease. Because the centrifugal force and paddle force decrease as the product size decreases, the normal force that holds the product against interior surface of the cutting head 12 (which controls slice thickness) also decreases as the product size decreases.

Figures 17A, 17B:
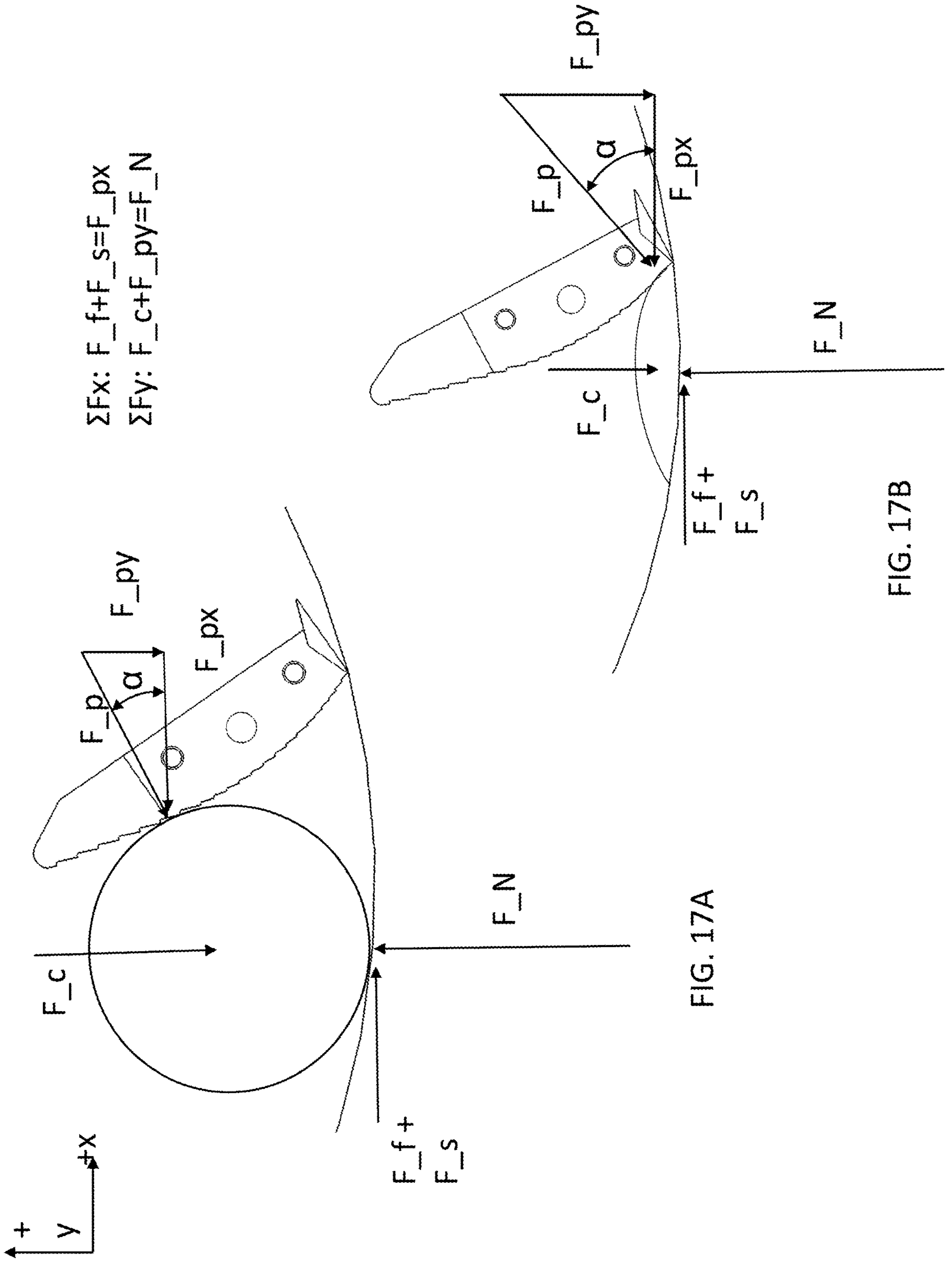
FIGS. 17A and 17B grammatically illustrate an effect of a convex curvature of the face of the paddle shown in FIGS. 13A and 13B.

As grammatically illustrated in FIGS. 17A and 17B, the convex curvature of the paddle face 64 evident in FIGS. 13B and 16 can be tailored so that, as the size of the product decreases the angle ($\alpha$) of the tangential paddle contact (F_py) increases, causing the paddle force (F_p) to increase. By appropriately tailoring the curvature of the paddle face 64, the paddle force (F_p) can be caused to increase at approximately the same rate as the centrifugal force (F_c) decreases, resulting in the normal force (F_N) remaining substantially constant as the product size decreases. For this purpose, the curvature of the paddle face 64 can be intentionally varied to have an increasingly smaller radius of curvature toward the cutting head 12. As a nonlimiting example, FIG. 13B represents (not to scale) the radius of curvature ($r_1$) of the paddle face 64 adjacent the innermost radial extent 79 of the paddle 62 as being greater than the radius of curvature ($r_2$) of the paddle face 64 adjacent the outermost radial extent 78 of the paddle 62.

The beneficial effect of the arcuate curvature of the paddle face 64 is believed to be further enhanced by providing on the paddle face 64 a plurality of grooves 102 that increase friction on the paddle face 64 to resist products from rolling while contacted by the paddle face 64 during slicing. For example, in FIG. 16 the indicated rotation (R) of the impeller 60 in the clockwise direction relative to the stationary cutting head 12 would induce rolling of the product 100A in the counter-clockwise direction, which is resisted by the grooves 102 (seen in profile) on the paddle face 64 engaging the product 100A. FIGS. 5, 7-9, 13A-B, and 14 show the grooves 102 as generally vertically oriented, i.e., parallel to the axis of the impeller 60, to create a friction component that opposes the rotation of the product 100A.

While the invention has been described in terms of specific or particular embodiments, it should be apparent that alternatives could be adopted by one skilled in the art. For example, the machine 10, cutting head 12, impeller 60, and their respective components could differ in appearance and construction from the embodiments described herein and shown in the drawings, functions of certain components of the machine 10, cutting head 12, and/or impeller 60 could be performed by components of different construction but capable of a similar (though not necessarily equivalent) function, and various materials could be used in their fabrication. In addition, the invention encompasses additional or alternative embodiments in which one or more features or aspects of a particular embodiment could be eliminated or two or more features or aspects of different disclosed embodiments could be combined. Accordingly, it should be understood that the invention is not necessarily limited to any embodiment described herein or illustrated in the drawings. It should also be understood that the purpose of the above detailed description and the phraseology and terminology employed therein is to describe the illustrated embodiments represented in the drawings, and not necessarily to serve as limitations to the scope of the invention. Therefore, the scope of the invention is to be limited only by the claims.

The invention claimed is:

1. An impeller adapted to be coaxially mounted within a cutting head for rotation about an axis of the cutting head, the impeller having a rotational direction and comprising:

- a lower plate having an upper surface, a lower surface, and a perimeter;
- paddles configured with the lower plate to direct material placed on the lower plate in a radially outward direction of the impeller when the impeller is rotated, a portion of at least a first paddle of the paddles being an outer radial extent of the first paddle, the outer radial extent defining an outermost radial extent of the first paddle adjacent the perimeter of the lower plate;

at least a first recess located in the lower plate that is continuous between the upper and lower surfaces of the lower plate and is contiguous with the perimeter of the lower plate, the first recess extending through the lower plate to define a passageway connected to the upper surface to enable debris at the upper surface to exit the impeller through the passageway; and a chute at the outer radial extent of the first paddle, the chute defining a first opening adjacent the first paddle, a second opening adjacent the first recess, and a passageway between the first and second openings through which the debris passes before exiting the impeller through the passageway of the first recess.

2. The impeller according to claim 1, wherein the outer radial extent of the first paddle radially protrudes over the first recess.

3. The impeller according to claim 1, wherein the first recess comprises first and second recess portions, and the first paddle is between the first and second recess portions such that the first recess portion is on a leading side of the first paddle and the second recess portion is on a trailing side of the first paddle, wherein the leading side is at a position on the impeller that precedes the trailing side in the rotational direction of the impeller.

4. The impeller according to claim 3, wherein the lower plate defines a peninsula that partially extends between the first and second recess portions, the first paddle is mounted to the peninsula, and the outer radial extent of the first paddle radially protrudes beyond the peninsula.

5. The impeller according to claim 3, further comprising a ramp that slopes downward from the upper surface of the lower plate toward the perimeter of the impeller, the ramp intersecting the first recess portion and being operable to capture the debris and then convey the debris to the first recess portion.

6. The impeller according to claim 3, wherein the second recess portion is larger than the first recess portion.

7. The impeller according to claim 6, wherein the second opening of the chute encloses the second recess portion so that the debris entering the chute exits the impeller through the larger recess portion.

8. The impeller according to claim 1, wherein the outer radial extent of the first paddle comprises at least one extension that defines a portion of the outermost radial extent of the first paddle and at least one gap at a lowermost extent of the first paddle.

9. The impeller according to claim 8, wherein the gap is adjacent the first recess so that the gap defines a part of the passageway of the chute through which the debris passes to exit the impeller.

10. The impeller according to claim 1, wherein the outer radial extent of the first paddle comprises multiple extensions spaced along the outermost radial extent of the first paddle to define multiple gaps therebetween.

11. The impeller according to claim 10, wherein the chute is attached to at least one of the extensions of the outer radial extent of the first paddle.

12. The impeller according to claim 1, wherein the first paddle has a leading side at a position on the impeller that precedes a trailing side of the first paddle in the rotational direction of the impeller, and the leading side defines a paddle face that has an arcuate convex shape.

13. The impeller according to claim 12, wherein the arcuate convex shape of the paddle face has a convex curvature that promotes a constant force applied to a material subjected to a centrifugal force resulting from rotation of the impeller as the size of the material decreases during slicing by the cutting head.

14. The impeller according to claim 13, wherein the convex curvature of the paddle face causes a force (F_p) applied by the paddle face to the material to increase as the size of the material decreases.

15. The impeller according to claim 12, wherein the arcuate convex shape of the paddle face has a convex curvature that has an increasingly smaller radius of curvature toward the outermost radial extent of the first paddle.

16. The impeller according to claim 12, wherein the arcuate convex shape of the paddle face has a plurality of grooves oriented to increase friction on the paddle face to resist the material from rolling while contacted by the paddle face.

17. The impeller according to claim 1, further comprising a guide that extends radially inward from an innermost radial extent of the first paddle and extends in the rotational direction of the impeller.

18. A cutting machine comprising an annular-shaped cutting head and an impeller coaxially mounted within the cutting head for rotation about an axis of the cutting head in a rotational direction of the impeller relative to the cutting head, the cutting head having multiple knives each extending radially inward toward the impeller in a direction opposite the rotational direction of the impeller, the impeller comprising:

a lower plate having an upper surface, a lower surface, and a perimeter;

paddles configured with the lower plate to direct material placed on the lower plate in a radially outward direction of the impeller when the impeller is rotated, a portion of at least a first paddle of the paddles being an outer radial extent of the first paddle, the outer radial extent defining an outermost radial extent of the first paddle adjacent the perimeter of the lower plate;

at least a first recess located in the lower plate that is continuous between the upper and lower surfaces of the lower plate and is contiguous with the perimeter of the lower plate, the first recess extending through the lower plate to define a passageway connected to the upper surface to enable debris at the upper surface to exit the impeller through the passageway; and a chute at the outer radial extent of the first paddle, the chute defining a first opening adjacent the first paddle, a second opening adjacent the first recess, and a passageway between the first and second openings through which the debris passes before exiting the impeller through the passageway of the first recess.

19. The machine according to claim 18, wherein the outer radial extent of the first paddle radially protrudes over the first recess.

20. The impeller according to claim 18, wherein the first recess comprises first and second recess portions, and the first paddle is between the first and second recess portions such that the first recess portion is on a leading side of the first paddle and the second recess portion is on a trailing side of the first paddle, wherein the leading side is at a position on the impeller that precedes the trailing side in the rotational direction of the impeller.

21. The impeller according to claim 20, wherein the lower plate defines a peninsula that partially extends between the first and second recess portions, the first paddle is mounted to the peninsula, and the outer radial extent of the first paddle radially protrudes beyond the peninsula.

22. The cutting machine according to claim 20, further comprising a ramp that slopes downward from the upper surface of the lower plate toward the perimeter of the impeller, the ramp intersecting the first recess portion and being operable to capture the debris and then convey the debris to the first recess portion.

23. The cutting machine according to claim 20, wherein the second recess portion is larger than the first recess portion.

24. The cutting machine according to claim 23, wherein the second opening of the chute encloses the second recess portion so that the debris entering the chute exits the impeller through the larger recess portion.

25. The cutting machine according to claim 18, wherein the outer radial extent of the first paddle comprises at least one extension that defines a portion of the outermost radial extent of the first paddle and at least one gap at a lowermost extent of the first paddle.

26. The cutting machine according to claim 25, wherein the gap is adjacent the first recess so that the gap defines a part of the passageway of the chute through which the debris passes to exit the impeller.

27. The cutting machine according to claim 18, wherein the outer radial extent of the first paddle comprises multiple extensions spaced along the outermost radial extent of the first paddle to define multiple gaps therebetween.

28. The cutting machine according to claim 27, wherein the chute is attached to at least one of the extensions of the outer radial extent of the first paddle.

29. The cutting machine according to claim 18, wherein the first paddle has a leading side at a position on the impeller that precedes a trailing side of the first paddle in the rotational direction of the impeller, and the leading side defines a paddle face that has an arcuate convex shape.

30. The cutting machine according to claim 29, wherein the arcuate convex shape of the paddle face has a convex curvature that promotes a constant force applied to a material subjected to a centrifugal force resulting from the rotation of the impeller as the size of the material decreases during slicing by the cutting head.

31. The cutting machine according to claim 30, wherein the convex curvature of the paddle face causes a force (F_p) applied by the paddle face to the material to increase as the size of the material decreases.

32. The cutting machine according to claim 29, wherein the arcuate convex shape of the paddle face has a convex curvature that has an increasingly smaller radius of curvature toward the outermost radial extent of the first paddle.

33. The cutting machine according to claim 29, wherein the arcuate convex shape of the paddle face has a plurality of grooves oriented to increase friction on the paddle face to resist the material from rolling while contacted by the paddle face.

34. The cutting machine according to claim 18, further comprising a guide that extends radially inward from an innermost radial extent of the first paddle and extends in the rotational direction of the impeller.

35. The cutting machine according to claim 18, wherein the outer radial extent of the first paddle comprises multiple extensions spaced along the outermost radial extent of the first paddle to define multiple gaps therebetween, the outer radial extent of the first paddle is in proximity to a knife and a gate of the cutting head, the gate is positioned relative to the knife so that a material subjected to the rotation of the impeller crosses a surface of the gate prior to encountering the knife, a trailing edge of the gate and a cutting edge of the knife define a gate opening that determines a thickness of a slice of the material produced by the knife, the surface of the gate has grooves that are parallel to the direction that the material travels across the surface of the gate toward the knife, and the gate comprises reliefs in the surface thereof that are deeper than the grooves, contiguous with the trailing edge of the gate, and oppose each of the gaps at the outermost radial extent of the first paddle.

* * * * *